P. M. Papin.

Ageing Spirits.

Nº 90,120.  Patented May 18, 1869.

Witnesses:
William W. Herthel
Robert Burns

Inventor:
P. M. Papin
H. Eothel & Co.
Atty.

UNITED STATES PATENT OFFICE.

P. M. PAPIN, OF ST. LOUIS, MISSOURI.

IMPROVED APPARATUS FOR AGING SPIRITS.

Specification forming part of Letters Patent No. 90,120, dated May 18, 1869.

*To all whom it may concern:*

Be it known that I, P. M. PAPIN, of St. Louis, in the county of St. Louis and State of Missouri, have made certain new and useful Improvements in Processes for Purifying and Aging Liquors; and I do hereby declare the following to be a full and correct account thereof, reference being had to the accompanying drawings, and to the letters of reference marked thereon.

The object of this invention is to purify the alcohol liquors, and especially to expedite and intensify the fermentation or other action which is needed to cause the disappearance of fusel and like poisonous oils, and the formation of the essential oils characterizing old and smooth liquors. In the achievement of said object the nature of this invention is in the formation of currents of fluid, and in the introduction of air-currents, said currents being under proper heat and passing in contact and commingled with each other, in order that thus the oxygenizing influence of the air may be fully and speedily exerted to effect the purposes of purification and aging.

To enable those herein skilled to make and use my said invention, I will now more fully describe the same, referring to the accompanying—

Figure 1:
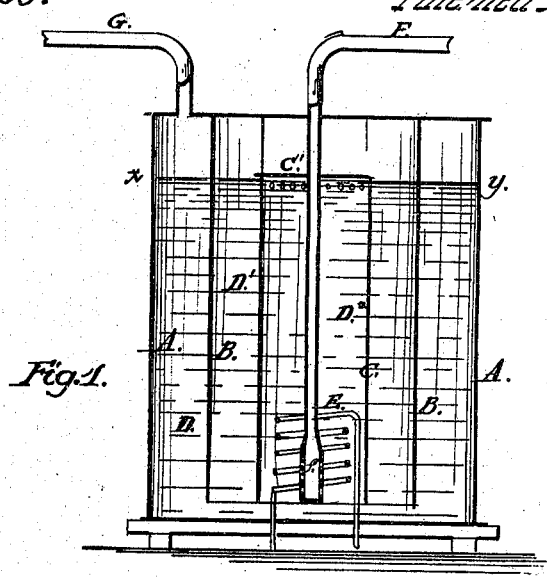
Figure 2:
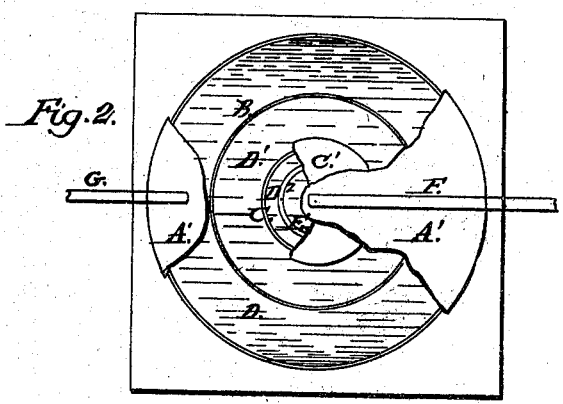

Figure 1 as a sectional elevation, and to Fig. 2 as a top plan, showing the cover of the vessel here used partly removed.

In the ordinary and usual application of my said invention, I employ a closed vessel or tank, A, into which the liquors are placed, the vessel being charged by any valve or pipe, in the manner usual. Said vessel has a depending diaphragm, B, connected to the cover A', usually concentric in form to the circumference of the vessel A, and extending nearly to the bottom of said vessel. Within the diaphragm B, I suspend from the cover A' the vessel C by suitable hanger rods or bars. Said vessel has a top, C', and its sides are perforated at E. It extends down to the same or greater depth in the vessel A as the diaphragm B.

There is thus inclosed in the vessel C the space D, between said vessel and the diaphragm B the space $D^1$, and between the diaphragm B and the vessel A the space $D^2$.

For purposes of creating a fluid current I use a heating-coil, E, arranged within the vessel C. In said coil steam or heated air may be used to convey the heat to the liquor. Said coil has proper stop-cocks or valves arranged for regulating the flow of steam or air in the same, in the usual manner.

In order to pass air into the liquor I arrange the air-duct F, passing down the center of the vessel C, and ending in a distributing-head, $f$, which is perforated to allow the air to distribute itself equitably in the liquor. Said duct is also arranged with proper valves or stop-cocks to regulate the flow of air.

Out of the space $D^2$ the spent air escapes, with such vapors as may be extracted from the liquor, through the discharge-pipe G; and to save the valuable parts of the vapors thus escaping said pipe may connect with a suitable condensing-vessel.

The action of the said parts is now as follows: Liquor being charged into the vessel A, say to a height indicated by the line $x\ y$, and being just above the perforations $c$ in the vessel C, then, by the action of the heating-coil E, the fluid, being gradually heated, rises up in the vessel C and flows through the perforations $c$, descending in the space $D^1$; and, similarly, the air, flowing out at the discharging-head $f$, rises with the ascending liquid, and, remaining in contact therewith, passes through the perforations $c$, and follows in the motion down the space $D^1$, and finally, rising in the space $D^2$, finds a discharge by the pipe G.

It is thus plain that the currents of liquor and air are kept in contact, and without undue agitation to prevent chemical action the oxygenizing influence of the air is exerted.

By increasing the number of diaphragms B and vessels C the travel of the said currents while in contact may be greatly increased.

Having thus fully described my said invention, what I claim is—

The combination of the air-duct F, with its perforations and head $f$, coil E, vessel C, with perforated cover C', spaces D, $D^1$, and $D^2$, diaphragm B, with vessel A, and pipe G, constructed and arranged to operate substantially in the manner and for the purpose described.

In witness of said invention I have hereunto set my hand.

P. M. PAPIN.

Witnesses:
WILLIAM W. HERTHEL,
GEO. P. HERTHEL, Jr.